Patented June 27, 1950

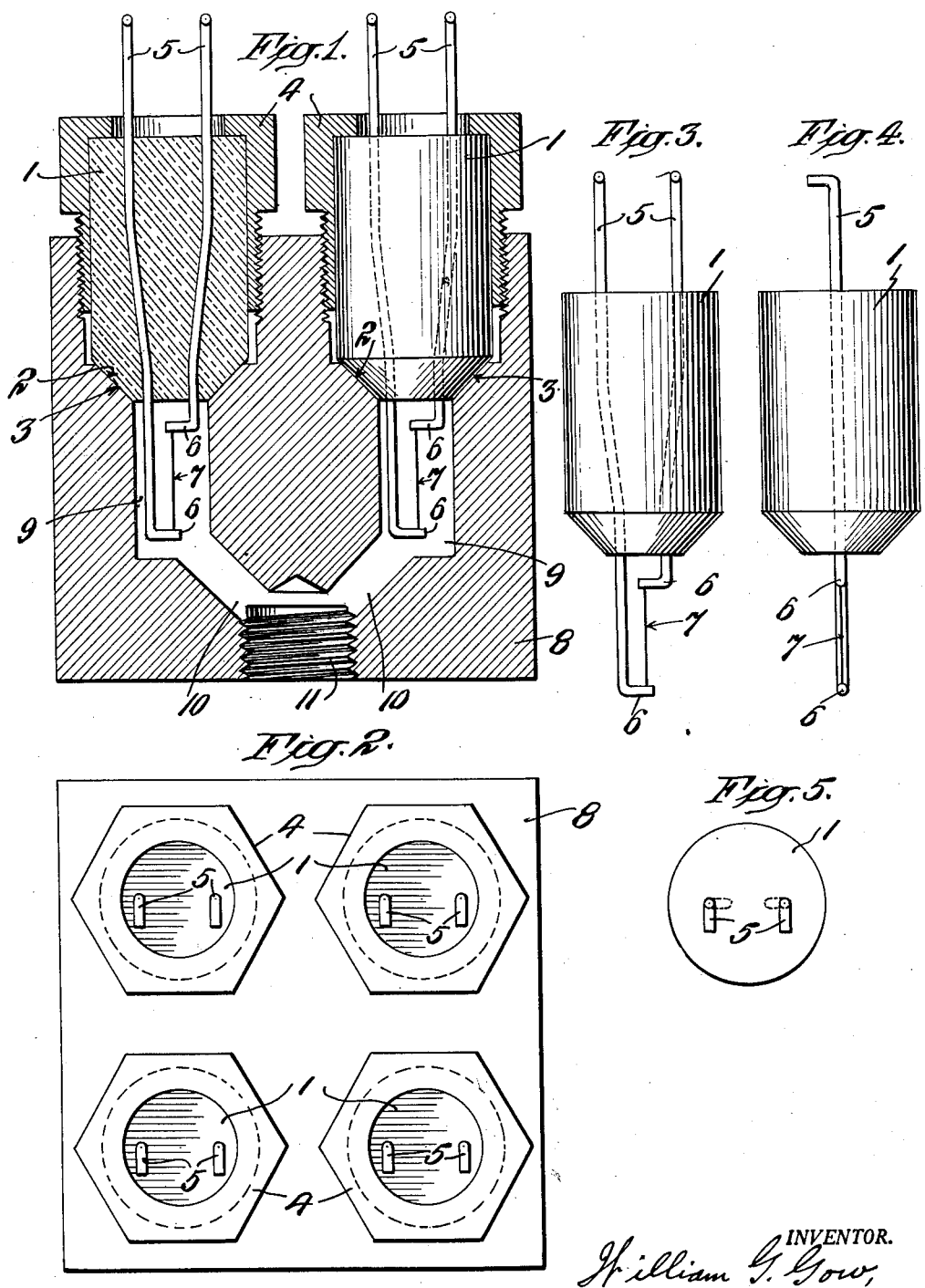

2,512,857

UNITED STATES PATENT OFFICE 2,512,857

GAS CELL

William G. Gow, Belleville, N. J.

Application February 23, 1946, Serial No. 649,634

2 Claims. (Cl. 73—27)

The present invention relates to a new and improved gas cell for use in analysing gases by the thermal conductivity method.

In my Patent No. 2,171,502 I pointed out the major drawbacks of gas cells hitherto employed, and described an improved cell which overcame the same. In my further researches in this field I have discovered that the relatively short and unpredictable useful life of prior gas cells is principally attributable to the prior method of mounting and sealing filaments in a chamber. In the field, the following conditions exist: Wide variation in ambient temperatures and pressures; wide variation in pressures of sampling gases taken from sampling lines; high temperature of sampling gases; extremely severe vibration conditions. Due to these factors, the gasketing, cementing or soldering of the individual cells in their holders as heretofore practiced has proved to be unsatisfactory under service conditions. The filament holders became loosened and rendered the electrical circuits unstable. As the result of such loosening, the reference gases became adulterated and the readings of the sampling gases became distorted due to the turbulence, flow sensitivity and other abnormalities peculiar to such a system.

One of the objects of the present invention is to provide a gas cell and mounting therefor which is not subject to the deficiencies of older cells as pointed out above.

Another object of the invention resides in the provision of a gas cell unit of a construction providing a gas-tight seal with its mounting block.

A further object of the invention includes the construction of the lead-in wire support of plastic, glass, porcelain or other suitable di-electric material and with a bearing surface complemental to a bearing surface formed in the cell block.

Other objects include an arrangement for accommodating any desired number of cells, the exertion of pressure on the wire supports in such manner as to tend to compress the same about the lead-in wires and in such other and further matters as will be understood by those skilled in this art.

In the accompanying drawing:

Figure 1 is a vertical sectional view through a 4-cell unit, which shows two reference cells optionally to be sealed by a plug or to admit sample gases, responding to my invention;

Figure 2 is a plan view of Figure 1;

Figure 3 is an elevational view of the lead-in wire support and wires;

Figure 4 is an elevational view at right angles to Figure 3, and

Figure 5 is a plan view of Figure 3.

As shown in Figures 3 to 5, the lead-in wires 5 are molded or set in a support or mount 1 of suitable di-electric material. The support may, for example, be of plastic, glass or porcelain and may be of cylindrical, conical, spherical or a combination shape. I prefer a cylindrical support formed of a synthetic resin of the phenol-formaldehyde type. The lead-in wires have laterally bent lower ends 6 between which extend the filament 7, in this a straight line filament but optionally of spiral, coiled or other shape, located coaxially with the support. The support is of the nature of a plug preferably cylindrical initially and machined subsequently to provide the lower end with a coaxial frusto-conical configuration having the annular beveled bearing surface 2.

A cell block 8, in this instance accommodating four gas cells but adapted to receive a desired number of cells from one up, is provided with cell chambers 9 which are appropriately contoured to receive supports 1 and the lower ends of the lead-in wires as well as the filaments and each having an open end. Auxiliary passages 10 converge to a common port for attachment to a pipe for gas sampling, designated as 11. The cell block has annular beveled bearing seats or surfaces 3 complemental to bearing surfaces 2 and equal in number to the number of gas cells each seat being coaxial with its cell chamber and disposed intermediate the length thereof. The abutment of surfaces 2 and 3 constitute gas-tight seals or joints, capable of withstanding static gas pressures up to 500 pounds. Each lead-in wire support 1 has a suitable hold-down device in this case a clamping bushing or sleeve 4 in which the support is loosely fitted and one end of which has an inwardly extending flange abutting the corresponding end of the support. These bushings are exteriorly screw-threaded and screwed into the open ends of the respective cell chambers and exert a downward thrust on supports 1 to maintain the bearing surfaces 2 and 3 in gas-tight contact and to centrally or coaxially locate the supports and the filaments in the respective chambers. Bushings 4 can be turned down or tightened as required from time to time to ensure the provisions of a gas-tight joint. If desired, however, bushings 4 could be omitted and the exterior of supports 1 provided with threads for direct engagement with the cell block. I prefer to employ bushings 4 as this arrangement provides a better construction.

It will further be appreciated that the downward pressure on supports 1 tends to compress the material of the supports about the lead-in wires thus overcoming any tendency of the wires to move longitudinally or to rotate. This tendency may be further offset by "toeing-in" the lead-in wires in the manner illustrated in Figure 3 or otherwise by arranging the lead-in wires in a non-parallel relationship.

It will further be noted, from Figure 2 in particular, that the unit is thermally symmetrical and this, I have found, contributes substantially to the efficiency and desirability of the structure described.

The foregoing is intended as illustrative and not as limitative since other and further variations may be resorted to without departing from the spirit or principle hereof. The invention is rather defined by the appended claims.

I claim:

1. A cell for use in analyzing gases, including a block having a cell chamber open at one end and formed with a concentric annular beveled seat for a wire support, a wire support comprising a non-conducting high dielectric cylindrical plug, said plug being beveled at one end to provide a bearing surface complementary to said beveled seat, wires embedded in and extending through said wire support, and means for clamping said wire support in said cell chamber with said beveled bearing surface in gas-tight contact with said beveled seat.

2. The cell as defined in claim 1 wherein the last-named means includes a bushing screw-threaded into the open end of said cell chamber in enclosing relation to said wire support and having an inwardly projecting flange in abutting contact with the end of said wire support opposite said bearing surface.

WILLIAM G. GOW.

REFERENCES CITED

The following references are of record in the file of this patent:

UNITED STATES PATENTS

| Number | Name | Date |
| --- | --- | --- |
| 1,231,045 | Means | June 26, 1917 |
| 1,698,887 | Krueger | Jan. 15, 1929 |
| 1,802,713 | Hebler | Apr. 28, 1931 |
| 1,829,649 | Harrison | Oct. 27, 1931 |
| 1,971,038 | Hamilton | Aug. 21, 1934 |
| 2,326,884 | Phelps | Aug. 17, 1943 |
| 2,428,121 | Minter | Sept. 30, 1947 |